United States Patent [19]

O'Keeffe

[11] 3,832,560

[45] Aug. 27, 1974

[54] METHOD AND APPARATUS FOR ELECTRON BEAM ALIGNMENT WITH A MEMBER BY DETECTING CATHODOLUMINESCENCE FROM OXIDE LAYERS

[75] Inventor: Terence William O'Keeffe, Pittsburgh, Pa.

[73] Assignee: Westinghouse Electric Corporation, Pittsburgh, Pa.

[22] Filed: Oct. 1, 1973

[21] Appl. No.: 402,249

Related U.S. Application Data

[63] Continuation-in-part of Ser. No. 370,115, June 13, 1973, abandoned.

[52] U.S. Cl. .......... 250/492, 219/121 EM, 250/397, 315/10

[51] Int. Cl. .......... H01j 29/50, H01j 31/49

[58] Field of Search .......... 250/396, 397, 398, 400, 250/458, 459, 491, 492, 492 A; 219/121 EB, 121 EM; 315/10, 31 R

[56] References Cited

UNITED STATES PATENTS

| | | | |
|---|---|---|---|
| 3,308,264 | 3/1967 | Ullery, Jr. | 219/121 |
| 3,679,497 | 7/1972 | Handy et al. | 250/492 |
| 3,710,101 | 1/1973 | O'Keeffe et al. | 250/492 |
| 3,745,358 | 7/1973 | Firtz et al. | 250/492 |

*Primary Examiner*—William F. Lindquist
*Attorney, Agent, or Firm*—C. L. Menzemer

[57] ABSTRACT

A method and apparatus are provided for alignment of an electron beam with precisely located areas of a major surface of a semiconductor member. At least one and preferably two spaced apart detector marks of predetermined shape formed by cathodoluminescent oxide layers are positioned adjacent the major surface. Each detector mark provides a differential in cathodoluminescence projected by the oxide layer corresponding to the area of the mark irradiated by an electron beam. To align, an electron beam to be aligned has at least one alignment beam portion corresponding to at least one detector mark and of predetermined cross-sectional shape. The alignment beam portions are projected onto the major surface of the member in the vicinity of the corresponding detector marks. And the cathodoluminescence generated by the oxide layers in at least the vicinity of the detector mark is detected by detecting means. The electron beam is moved relative to the member while continuing said detection until the detected cathodoluminescence indicates optimum alignment of each alignment beam portion thereof with a corresponding detector mark. Preferably, said alignment method is used in producing a very accurate component pattern in electroresist layer on the major surface of the member with either a scanning electron beam or a patterned electron beam generated by a photocathode source.

22 Claims, 14 Drawing Figures

METHOD AND APPARATUS FOR ELECTRON BEAM ALIGNMENT WITH A MEMBER BY DETECTING CATHODOLUMINESCENCE FROM OXIDE LAYERS

RELATED APPLICATION

This application is a continuation-in-part of copending application Ser. No. 370,115, filed June 13, 1973, now abandoned.

GOVERNMENT CONTRACT

This invention is made in the course of or under Gevernment Contract F 33615-67-C-1335.

FIELD OF THE INVENTION

The invention relates to the making of integrated circuits and other micro-miniature electronic components with submicron accuracy.

BACKGROUND OF THE INVENTION

The present invention is an improvement on the electron beam fabrication system and the alignment system therefor described in U.S. Pat. Nos. 3,679,497 and 3,710,101, granted July 25, 1972 and Jan. 9, 1973, respectively, both of which are assigned to the assignee of the present application. In the fabrication system, a planar photocathode source (called an "electromask") produces a patterned beam of electron radiation which is directed onto an electron sensitive layer (called an "electroresist") on a major surface of a member spaced from the photocathode to cause a pattern differential in solubility between irradiated and unirradiated areas of the sensitive layer. The pattern is differential solubility is transferred to a pattern in a component layer or the member by removing the less soluble portion of the electro-resist layer to form a window pattern therein, and subsequently selectively etching or doping the component layer or body through the window pattern developed in the resist layer, or depositing a component layer, such as by evaporation, sputtering, oxidizing or epitaxially growing, through the window pattern in the electroresist layer.

The resolution of the electron image projection system, e.g., less than 0.5 micron, is however lost in the juxtaposition of component patterns unless the same resolution can be maintained in the alignment of successive electromasks. Making of an integrated circuit device requires, for example, registration and irradiation of at least two to 10 different component patterns in electroresist layers that are subsequently developed and transferred to a component layer by etching, doping or deposition. The electron radiation for each pattern must be aligned with precisely located areas of the major surface each time with a precision of 0.5 micron or less with respect to the first pattern. Otherwise, the precision and economies of the electron image projection system will not be obtained in the finished integrated circuit device.

Apparatus has been developed for precision juxtaposition of multiple component patterns by use of electron beam induced conductivity marks (EBIC). See U.S. Pat. No. 3,710,101, granted Jan. 9, 1973 and U.S. Pat. Application Ser. No. 264,699, filed June 20, 1972, both of which are assigned to the same assignee as the present application. At least one and preferably two small spaced apart indexing electron beam patterns or marks of predetermined cross-sectional shapes are provided on the photocathode source to produce alignment beam portions; and detector marks of predetermined shapes, preferably the same shapes as the corresponding alignment beam portions, are formed in an oxide layer on a member and overlaid with a metal layer. A DC potential is applied across the oxide layer between the metal layer and the member. The subsequent current flow between the terminals will vary in correspondence to the portion or area of the detector mark irradiation by the corresponding alignment beam portion. Thus, the alignment beam portion can be precisely aligned with the detector mark by reading the electron induced current corresponding to the area of the detector mark irradiated. The electrical current flow may be processed through an amplifier to actuate a servomechanism to move the photocathode source or the substrate, or to change the magnetic field formed by focusing and deflecting electromagnetic coils surrounding the photocathode source and member to align and direct the electron beam pattern, and in turn provide automatic alignment of the alignment beam portions and corresponding detector marks.

A difficulty with this alignment system is that the detector marks must be fabricated on the member itself. Although this can be accomplished in some instances with negligible interference, it may require additional fabrication steps to prepare the detector marks on he member for the alignment system. Further, the portions of the member on which the detector marks are formed are lost from use in the integrated circuit and therefore substantial waste of the member results. Moreover, the alignment system requires providing a circuit across the detector marks, which is expensive and cumbersome; remote readings from the detector marks cannot be made.

SUMMARY OF THE INVENTION

The method and apparatus are provided for the alignment of an electron beam with a member with a desired degree of accuracy of, for example, 0.5 micron or less. The invention eliminates fabrication steps previously necessary to the making of an alignment apparatus for the electron image projection system. Moreover, the areas of the major surface of the member where the detector marks are located are made available in certain instances for use in the integrated circuit which is fabricated, and readings from the detector marks can be taken at remote positions from the marks.

A member is provided with an oxide layer on a major surface thereof which generates cathodoluminescence that preferably corresponds in intensity to the thickness of the oxide layer. The member may be a single-crystal wafer of, for example, silicon made by any of the well-known techniques. Alternatively, the member may be an epitaxially grown layer on a suitable supporting substrate such as sapphire. In any case, the member having thereon at least one oxide layer capable of generating cathodoluminescence is prepared for use in the alignment system by forming at least one and preferably two widely spaced detector marks of predetermined shapes adjacent the major surface in or on which the integrated circuit or other electronic component is to be formed. Each detector mark of predetermined shape is capable of providing a differential in cathodoluminescence generated by the oxide layer corresponding to the area of the mark irradiated by an electron beam. The predetermined shapes of the detector marks are preferably all the same and are preferably of a regular geometric shape such as a circle, rectangule, triangle or the like.

The detector marks of predetermined shapes may be made in any number of suitable embodiments. For example, eahc mark may be formed by simply providing a well in the oxide layer of the predetermined shape and having the cathodoluminescence corresponding in intensity to the thickness of the oxide layer. Thus the electron beam may penetrate and the cathodoluminescence transmitted through the member to provide a differential in cathodoluminescence at the surface of the member opposite the oxide layer. Alternatively, the oxide layer may be formed on the major surface in the predetermined shape. In still a further alternative, a metal or insulating opaque layer may be formed adjacent the oxide layer, either above or below it, to circumscribe an exposed portion of the oxide layer in the predetermined shape.

Further, the negative of these embodiments may provide the desired differential in cathodoluminescence. Specifically, detector marks may be provided by a mesa of the predetermined shape provided instead of a well so that greater intensity cathodoluminescence is given off when the electron beam irradiates the area surrounding the mark than when the electron beam irradiate the area of the detector mark. Similarly, the oxide layer may circumscribe an exposed portion of the major surface of the member, the exposed portion being in the predetermined shape; or the opaque layer adjacent the oxide layer may be provided in the predetermined shape rather than circumscribing a portion in the surface to form the desired detector mark.

To align an electron beam with the member, the electron beam to be aligned is disposed so that at least one alignment portion thereof is projected onto the major surface of the member in the vicinity of a corresponding detector mark. Each alignment beam portion is of a predetermined cross-sectional shape at least as small as the corresponding detector mark and is typically of the same geometric shape. For convenience and accuracy of alignment in some embodiments, the cross-sectional shape of each alignment beam portion is of substantially the same shape as the predetermined shape of the corresponding detector mark or marks. In either embodiment, a photodetector is positioned to detect, either through the member or on reflection, the cathodoluminescence generated by irradiation of the oxide layer at least in the vicinity of the detector marks. The electron beam is typically moved relative to the member while continuing the detection until the detected radiation indicates optimum alignment of the alignment beam portions with the corresponding detector marks.

The alignment beam portions and the detector marks may be of any suitable relative size within practical limit, provided the shapes of both are predetermined. Preferably, however, each alignment beam portion is of the same crosssectional shape as the predetermined shape of the corresponding detector mark so that alignment can be determined by reading a maximum or a minimum in the electrical signal from the detector means. Otherwise, electrical processing of the electrical signals are needed, while the alignment beam portions are oscillated over the corresponding detector marks, to determine optimum alignment of the alignment beam portions with the corresponding detector marks.

The present invention is particularly useful in producing a very accurate component pattern or patterns in an electroresist layer or series of electroresist layers on the major surface of the member. Typically, the alignemnt is accomplished by selective irradiation of the electroresist layers either with a scanning electron beam or a patterned beam of electrons generated by a photocathode source.

When the scanning electron beam is used for selective irradiation, the major surface of the member is divided into contiguous fields with the detector marks preferably positioned symmetrically at the boundaries between the fields. In this way, the electron beam can be aligned with each field in turn and then the field be selectively irradiated. After each field is selectively irradiated, the member is moved to permit aligning said selective irradiation of another field with the scanning electron beam.

In aligning the photocathode source with precisely located areas of the major surface of the member in an electron image projection system, preferably two detector marks are spaced apart preferably opposite each other along the periphery on the major surface of the integrated circuit area, and corresponding alignment beam portions are provided as part of the patterned electron beam generated by the photocathode source. Photodetector means are positioned either adjacent the detector marks preferably adjacent the opposite surface of the member, or adjacent the photocathode source preferably adjacent the oxide layer. The radiation generated by impingement of the alignment beam portion at or adjacent the corresponding detector marks is detected by the corresponding detectors which output electrical signals corresponding to the intensity of the radiation. The patterned electron beam is then moved relative to the member, either manually or automatically, until the detected cathodoluminescence indicated optimum alignment of the alignment beam portions with corresponding detector marks.

Preferably, the alignment is done automatically by an electrical means which moves the patterned beam of electrons relative to the member responsive to the electrical signal from the detector means. The electrical means preferably includes for this purpose a modulation means for oscillating the movement of each alignment beam portion over a detector mark; phase detection means, preferably synchronized with the modulation means, for detecting along orthogonal axes the error from alignment of the alignment beam portion and the detector mark and outputting an electrical signal corresponding thereto; and actuating means for changing the electrical input to electromagnetic means directing the patterned electron beam from the photocathode source onto the member responsive to the electrical signal from the phase detector means. Preferably, the electrical means also includes termination means for terminating the oscillation by actuating means at optimum alignment of the alignment beam portions and corresponding detector marks.

Other details, objects and advantages of the invention will become apparent as the following description of the presently preferred embodiments and presently preferred methods of practicing the same proceeds.

BRIEF DESCRIPTION OF THE DRAWINGS

In the accompanying drawings, the present preferred embodiments of the invention and the present preferred methods of practicing the invention are illustrated in which.

DESCRIPTION OF THE PREFERRED EMBODIMENTS

An electron image projection device suitable to practice the present invention is described in U.S. Pat. Nos. 3,679,497 and 3,710,101 except for the alignment technique and apparatus therefor. For convenience and clarity of description the device is redescribed in part here.

Figures 1, 2, 3:
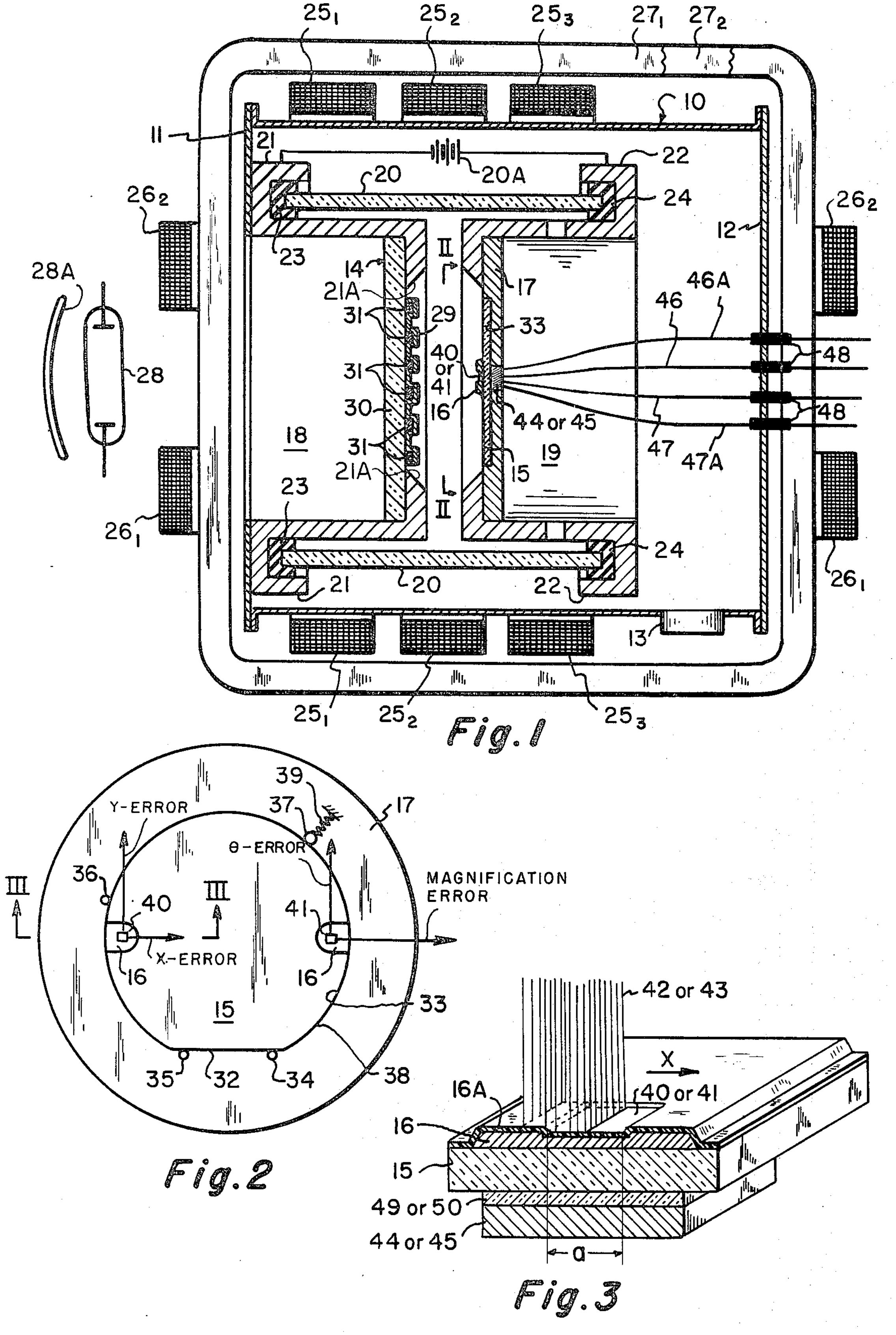
FIG. 1 is a cross-sectional view in elevation of an electron image projection device employing the present invention.
FIG. 2 is a fragmentary cross-sectional view in elevation taken along line II—II of FIG. 1.
FIG. 3 is a fragmentary cross-sectional view in perspective taken along line III—III of FIG. 2.
Figure 4:
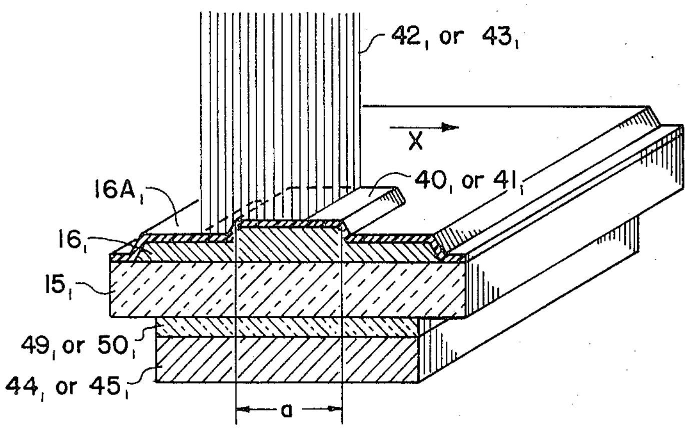
FIG. 4 is an alternative fragmentary cross-sectional view in perspective taken along line III—III of FIG. 2.

Referring to FIG. 1, an electron image projection device is shown. A hermetically sealed chamber 10 of nonmagnetic material has removed end caps 11 and 12 to allow for disposition of apparatus into and removal of apparatus from the chamber. A vacuum port 13 is also provided in the sidewall of chamber 10 to enable a partial vacuum to be established in the chamber after it is hermetically sealed.

Disposed within chamber 10 is cylindrical photocathode source of electromask 14 and alignable member 15 in substantially parallel, spaced relation. Member 15 is a single-crystal body, or a substrate with an epitaxial layer with oxide layers 16 thereon. Member 15 is supported in specimen holder 17 as more fully described hereinafter Photocathode 14 and holder 17 are in turn positioned in parallel array by annular disk-shaped supports 18 and 19, respectively. Electromask 14 and holder 17 are spaced apart with precision by tubular spacer 20 which engages grooved flanges 21 and 22 via gaskets 23 and 24 around the periphery of supports 18 and 19. The entire assembly is supported from end cap 11 of chamber 10 at support 17 to allow for ease of disposition of the photocathode source and the member within the chamber.

Photocathode 14 is made cathodic and member 15 is made anodic to direct and accelerate electrons emitted from the photocathode to the member 15. To accomplish this, holder 17 and supports 18 and 19 are of highly conductive material and spacer 20 is of high insulating material. A potential source 20A of, for example, −10Kv is applied between supports 18 and 19. The difference in potential is conducted to and impressed on photocathode 14 and member 15 via supports 18 and 19 and holder 17.

Surrounding chamber 10 are three series of electromagnetic coils, positioned perpendicular to each other, to control and direct the impingement of the electron beam onto substrate 15. Cylindrical electromagnetic coils $25_1$, $25_2$ and $25_3$ are positioned axially along the path of the electron beam from photocathode 14 to member 15 to cause electrons to spiral and move radially as they travel the distance from the photocathode to the member. These coils permit control of the rotation ($\theta$) and the magnification (M) of a patterned electron beam emitted from the electromask to provide for focusing of the electron beam. Rectangular electromagnetic coils $26_1$ and $26_2$, and $27_1$ and $27_2$ are symmetrically positioned perpendicular to each other in Helmoholtz pairs, and to coils $24_1$–$24_3$, to cause electrons to transversely deflect as they travel the distance from the photocathode to the member. These electromagnets permit control of the direction (in X and Y coordinates) of a patterned electron beam emitted from the photocathode.

In operation, light source 29 such as a mercury vapor lamp backed by reflector 28A irradiates a photocathode layer 29 (e.g., gold or palladium) in the photocathode source or electromask 14. The photocathode layer is irradiated through a substantially transparent substrate 30 such as quartz overlaid with a layer 31 containing the negative of a desired component pattern. The layer 31 is of material (e.g., titanium dioxide) which is opaque to the light radiation. The photocathode material is thus made electron emissive in a patterned electron beam corresponding to the desired component pattern. A part of the patterned electron beam emitted from the photocathode source 14 is at least one and preferably two relatively small alignment beam portions 42 and 43 of predetermined cross-sectional shape (e.g., squares of 300 × 300 microns) which are widely spaced apart preferably oppositely positioned along the periphery of the patterned beam from the photocathode.

Referring to FIG. 2, member 15 is precision mounted within physically permissible limits in holder 17 and in turn with respect to photocathode 14. Member 15 has a flat peripheral portion 32 and holder 17 has depression 33 into which member 15 fits. Holder 17 has pins 34, 35, 36 and 37 positioned in respective quadrants around the periphery of depression 33. Member 15 is positioned by resting flat peripheral portion 32 of member 15 against pins 34 and 35 and curvilinear peripheral portion 38 of member 15 against pin 36. The member is thereby located with an accuracy of about 25 microns or less. Movable pin 37, which is fitted with a compression spring 39, is positioned and pushed against the curvilinear portion of member 15 to firmly retain member 15 and in turn, maintain member 15 precisely located.

Referring to FIG. 3, detector marks 40 and 41 of predetermined shapes are provided on oxide layers 16 to provide a differential in cathodoluminescence generated by the layers corresponding to the areas of the marks irradiated by an electron beam. Marks 40 and 41 of predetermined shapes are provided by forming preferably planar bottom wells in the oxide layers 16 of predetermined planar shapes. Detector marks 40 and 41 can be reasonably precisely formed by etching or ion milling the member through window patterns of the desired planar shape in a photo- or electroresist layer (not shown) so that the thickness of oxide layer 16 at the well is preferably 0 to 50 percent of the thickness of the oxide layer at surrounding areas.

As shown, marks 40 and 41 are preferably of substantially the same shape as the predetermined cross-sectional alignment beam portions 42 and 43. The cross-sectional shape of the alignment beam portions and detector mark are thus preferably about 10 × 10 mils in any suitable geometric shape, such as a square, rectangle or circle. The thickness of the member 15 particularly at marks 40 and 41 is important to the operation of the alignment system. The thickness at the marks must be small enough to permit penetration of the electron beam into the member 15 so that cathodoluminescence radiates from the opposite major surface of the member 15. The allowable thickness therefor depends on the energy level of the electron beam. For example, a 10 kilovolt electron beam requires a thickness at marks 40 and 41 of about 1 micron or less, while a 30 kilovolt electron beam permits a thickness of about 5 microns or less. The major surface of member 15 is then overlaid with a layer of electro-resist, as show, in which the precision component pattern is to be formed.

Positioned behind detector marks 40 and 41 in holder 17 are photodetector means 44 and 45, respectively, each with leads 46 and 47 and leads 46A and 47A, respectively extending through vacuum seals in chamber 10 at 48. Photo-detectors 44 and 45 are adapted for detecting the cathodoluminescence produced by the oxide layer and are substantially larger in size than and circumscribe marks 40 and 41 so that they can detect even dispersed and scattered cathodoluminescence from oxide layer 16 is the vicinity of the detector marks. For this reason, detector means 44 and 45 are also positioned in as close a proximity to marks 40 and 41 as the geometry will permit so that resolution of the light signal and in turn accuracy of alignment is not lost between the detector mark and the detector means. In this connection it should be noted that in some embodiments it may be appropriate to position the detector means 44 and 45 on the same side of the member 15 as the photocathode source at, for example, 21A so that reflected cathodoluminescence is detected. However, it is preferred that the detector means 44 and 45 be positioned opposite the member 15 from the photocathode source 14 where member 15 is transmissive so that resolution is not lost.

In operation, the alignment beam portions 42 and 43 of predetermined cross-sectional shapes impinge on and overlap the corresponding detector marks 40 and 41 of predetermined shapes, respectively. The electron beams produce a cathodoluminescence which corresponds in intensity to the area of the member 15 irradiated. Alignment can be accurately recorded therefore simply by observing the intensity of the light at detector means 44 and 45. In this connection, it should be noted that light filters 49 and 50 are preferably interposed between member 15 and detector means 44 and 45, respectively, so that only light of the higher intensity provided by impingement of electron beams 42 and 43 on or adjacent detector marks 40 and 41 register on the photoconductors. Where the alignment beam portions and corresponding detectors marks are of the same predetermined shape, alignment can thus be brought about simply by detecting where the detected cathodluminescence indicates the maximum intensity of the cathodoluminescence from the oxide layer 16.

Referring to FIGS. 4, 5, 6, 7, 8, 9 and 10, alternative embodiments are shown for detector marks 40 and 41 of predetermined shapes. Specifically, detector marks $\mathbf{40_1}$ and $\mathbf{41_1}$ of predetermined shapes are provided by forming mesas in member 15 of the predetermined shape. Each mesa can be formed with a high degree of precision again by etching or ion milling the negative of the mesas in the member 15 through window patterns in suitable photo- or electro-masks. This embodiment operates essentially the same as the embodiment as described in FIG. 3. However, here are important thickness is of the member at the portion surrounding the marks $\mathbf{40_1}$ and $\mathbf{41_1}$ rather than at the marks, since what is detected is a lack of cathodoluminescence rather than a presence of cathodoluminescence. In turn, where the alignment beam portions and corresponding detector marks are of the same predetermined shape, the electron beam can be precision aligned with the substrate by reading where the minimum intensity of cathodoluminescence is sensed.

Figure 5:
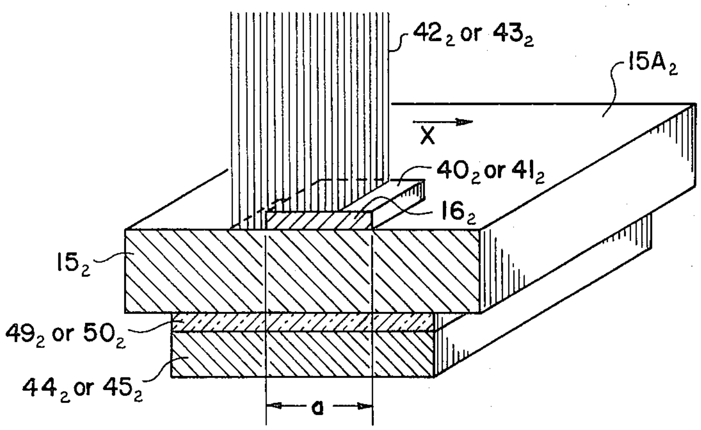
FIG. 5 is a second alternative fragmentary cross-sectional view in perspective taken along III—III of FIG. 2.

Referring to FIG. 5, detector marks $\mathbf{40_2}$ and $\mathbf{41_2}$ of predetermined shapes are provided by forming an oxide layer 16 over the major surface $\mathbf{15A_2}$ of member $\mathbf{15_2}$ in predetermined shape for the detector marks. The oxide layers 16 can be readily made in the predetermined shape by standard techniques by forming the oxide layer over the entire surface area and then etching or ion milling through the oxide layer to expose surface portions of surface $\mathbf{15A_2}$ in the negative of the desired detector marks. The remainder of the alignment system is as above described with respect to FIGS. 1, 2 and 3. The operation is again as described with reference to FIG. 3 where alignment is achieved by reading the intensity cathodo-luminescence at the detector means $\mathbf{44_2}$ and $\mathbf{45_2}$.

Figure 6:
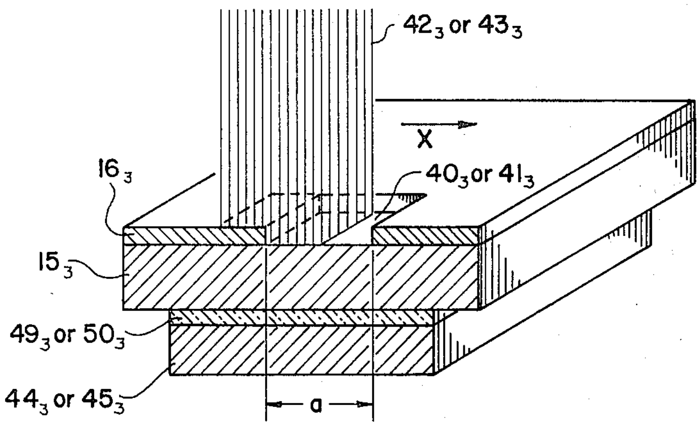
FIG. 6 is a third alternative fragmentary cross-sectional view in perspective taken along III—III of FIG. 2.

Referring to FIG. 6, detector marks $\mathbf{40_3}$ and $\mathbf{41_3}$ of predetermined shapes are provided by forming oxide layers $\mathbf{16_3}$ circumscribing the area of the detector marks. Detector marks $\mathbf{40_3}$ and $\mathbf{41_3}$ are thus provided by the exposed portions of surface $\mathbf{15A_3}$ in the predetermined shape of the marks, and are preferably formed in the same way as described in reference to FIG. 5. Indeed, this embodiment is the negative of the embodiment shown in FIG. 5 and differs in operation only in that the minimum cathodoluminescence is detected to optimize alignment of the alignment beam portions $\mathbf{42_3}$ and $\mathbf{43_3}$ with the detector marks $\mathbf{40_3}$ and $\mathbf{41_3}$, respectively, where the alignment beam portions and corresponding detector marks are of the same predetermined shape.

Figure 7:
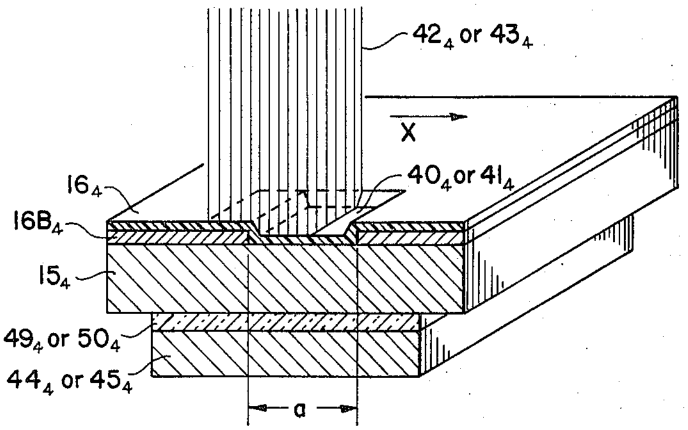
FIG. 7 is a fourth alternative fragmentary cross-sectional view in perspective taken along III—III of FIG. 2.

Referring to FIG. 7, detector marks $\mathbf{40_2}$ and $\mathbf{41_2}$ of predetermined shapes are provided by forming an opaque layer $\mathbf{16B_4}$ under oxide layers $\mathbf{16_4}$ on major surface $\mathbf{15A_4}$ in an area surrounding the detector marks. Detector marks $\mathbf{40_4}$ and $\mathbf{41_4}$ of predetermined shapes are thus provided by the circumscribed surface portions of oxide layers $\mathbf{16_4}$ being in the predetermined shape. The opaque layers $\mathbf{16B_4}$ can be readily made by standard techniques by forming an opaque layer over the entire surface area of surface $\mathbf{15A_4}$ and then etching or ion milling through the opaque layer to expose surface portions of surface $\mathbf{15A_4}$ in the form of the desired detector marks. The detector marks are thereafter completed by forming oxide layers $\mathbf{16_4}$ over the opaque layers and surrounding portions of surface $\mathbf{15A_4}$. The remainder of the alignment system is as above described with respect to FIGS. 1, 2 and 3. The composition of the opaque layer may be any suitable material such as metal which absorbs or reflects the cathodoluminescence as desired. In this connection it should be noted that "opaque" does not mean that the layer totally absorbs or reflects the cathodoluminescence. The "opaque" layer only absorbs or reflects sufficient light energy to provide a discernible differential in cathodoluminescence produced. The opaque layer may even itself be cathodoluminescent provided it generates radiation which is discernibly different from the cathodoluminescence of the oxide layer $\mathbf{16_4}$. The operation is similar to that described with reference to FIG. 3 except where the opaque layer blocks cathodoluminescent emissions so that, as in FIG. 3 where the alignment beam portions and corresponding detector marks are of the same predetermined shapes, alignment is achieved by reading the maximum intensity cathodoluminescence at the detector means $\mathbf{44_4}$ and $\mathbf{45_4}$.

Figure 8:
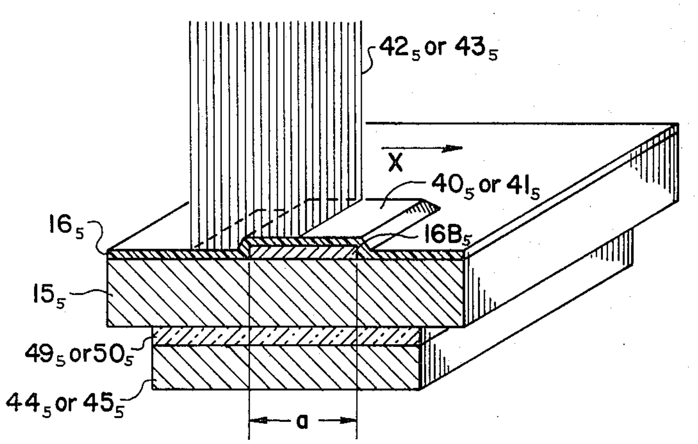
FIG. 8 is a fifth alternative fragmentary cross-sectional view in perspective taken along III—III of FIG. 2.

Referring to FIG. 8, detector marks $\mathbf{40_5}$ and $\mathbf{41_5}$ of predetermined shapes are provided by forming opaque layers $\mathbf{16B_5}$ under oxide layers $\mathbf{16_5}$ on major surface $\mathbf{15A_5}$ in the area of the detector marks. The opaque layers are of the predetermined shapes of the detector marks, are of the same composition as the opaque layer of FIG. 7, and are formed in the same way. This embodiment is the negative of the embodiment shown in FIG. 7 and differs in operation only in that the minimum cathodoluminescence is detected to optimize alignment of where alignment beam portions $\mathbf{42_5}$ and $\mathbf{43_5}$ and detector marks $\mathbf{40_5}$ and $\mathbf{41_5}$, respectively, are of the same predetermined shapes.

It should also be noted with reference to FIGS. 7 and 8 that similar embodiments may be made by applying the opaque layers 16B over the oxide layers 16 instead of under them. The opaque layer in these embodiments usually inhibits the penetration of the electron beam into the oxide layer to provide the differential in cathodoluminescence instead of inhibiting the cathodoluminescent emission as in FIGS. 7 and 8. Alternatively, the opaque layer over the oxide layer may also operate to reduce the cathodoluminescence generated by the oxide layer where the detector is positioned on the same side of the member as the photocathode source.

Figure 9:
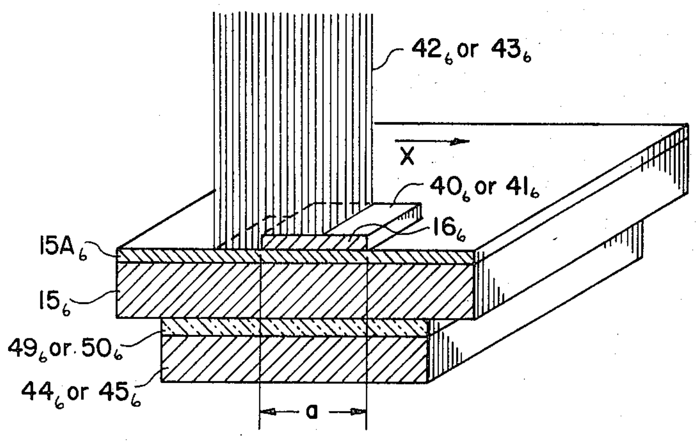
FIG. 9 is a sixth alternative fragmentary cross-sectional view in perspective taken along III—III of FIG. 2.

Referring to FIG. 9, detector marks $\mathbf{40_6}$ and $\mathbf{41_6}$ of predetermined shapes are provided generally as above described with reference to FIG. 5. The composition and operation are precisely the same as there described except for the character of member $\mathbf{15_6}$. Member $\mathbf{15_6}$ is an epitaxially grown layer supported by a suitable substrate such as sapphire which is preferably transparent to the cathodoluminescent radiation from oxide layer $\mathbf{16_6}$.

Figure 10:
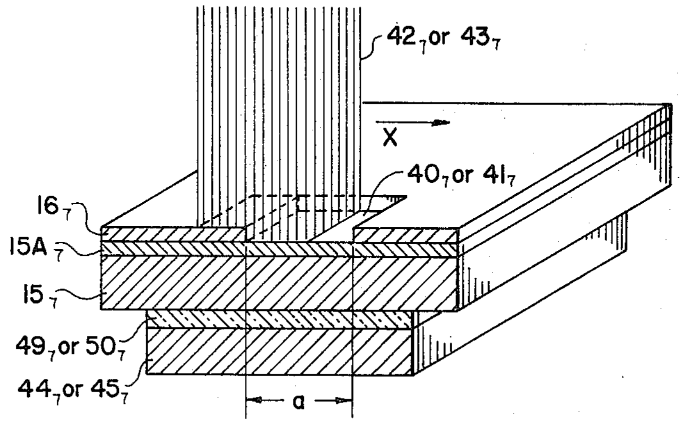
FIG. 10 is a seventh alternative fragmentary cross-sectional view in perspective taken along III—III of FIG. 2.

Referring to FIG. 10, detector marks $\mathbf{40_7}$ and $\mathbf{41_7}$ of predetermined shapes are provided generally as above described with reference to FIG. 6. The composition and operation are again precisely the same except for the character of member $\mathbf{15_7}$. In FIG. 10 member $\mathbf{15_7}$ is epitaxially grown on a suitable supporting substrate such as sapphire which is preferably transparent to the cathodoluminescent radiation from oxide layer $\mathbf{16_7}$.

Irrespective of the embodiment, the present invention provides a method of alignment of the patterned electron beam generated by the photocathode source 14 with precisely located areas of a major surface of the member 15. Further, the member may be similarly aligned with successive photocathode sources or electromasks by use of the same detector marks and like alignment beam portions on the successive photocathodes so that all of the patterned electron beams will selectively impinge on the member with the desired precision exactness, e.g., within a fraction of a micron. Error is reduced to the precision with which the detector marks and the photocathode layers emitting the corresponding alignment beam portion can be shaped and spatially located, which presents no difficulty with the scanning electron microscope and electron image projection system.

Where the predetermined cross-sectional shape of the alignment beam portion is smaller than the predetermined shape of the corresponding detector marks, the reading of detector means 43 and 44 to determine optimum alignment is somewhat different than above described. Optimum alignment is no longer indicated by the maximum or minimum in the signal readings from the detector means. Rather, plateau are reached in the signal readings, and optimum alignment is achieved by either selecting a certain point on the plateau taking into consideration any difference in the geometric shapes between the alignment beam portions and detector marks, or selecting a certain point on the signal rise from the detector means as the alignment beam portions move into or out of the corresponding detector marks. The latter alignment sequence permits alignment with the edge of the detector mark. Any of these embodiments may be used in either a manual or automatic alignment system with electrical signal processing apparatus such as that hereinafter described. These alternative embodiments for the alignment system are more useful however in alignment of the scanning electron beam system as hereinafter described, than alignment of the electron image projection as hereinbefore described.

The electric current flow from the detector means 44 and 45 may be processed through suitable electronic amplifiers and servomechanisms to automatically shift the entire patterned electron beam relative to the member and precisely position the alignment beam portion 42 and 43 in alignment with the detector marks 39 and 40, respectively. For this purpose, suitable means such as a modulation means is preferably used to oscillate the electrical input to the electromagnetic coils and thereby cause the alignment beam portions 42 and 43 to oscillate or move typically in a circle over the detector marks 40 and 41 so that the electrical outputs from detector means 44 and 45 are modulated.

Figure 11:
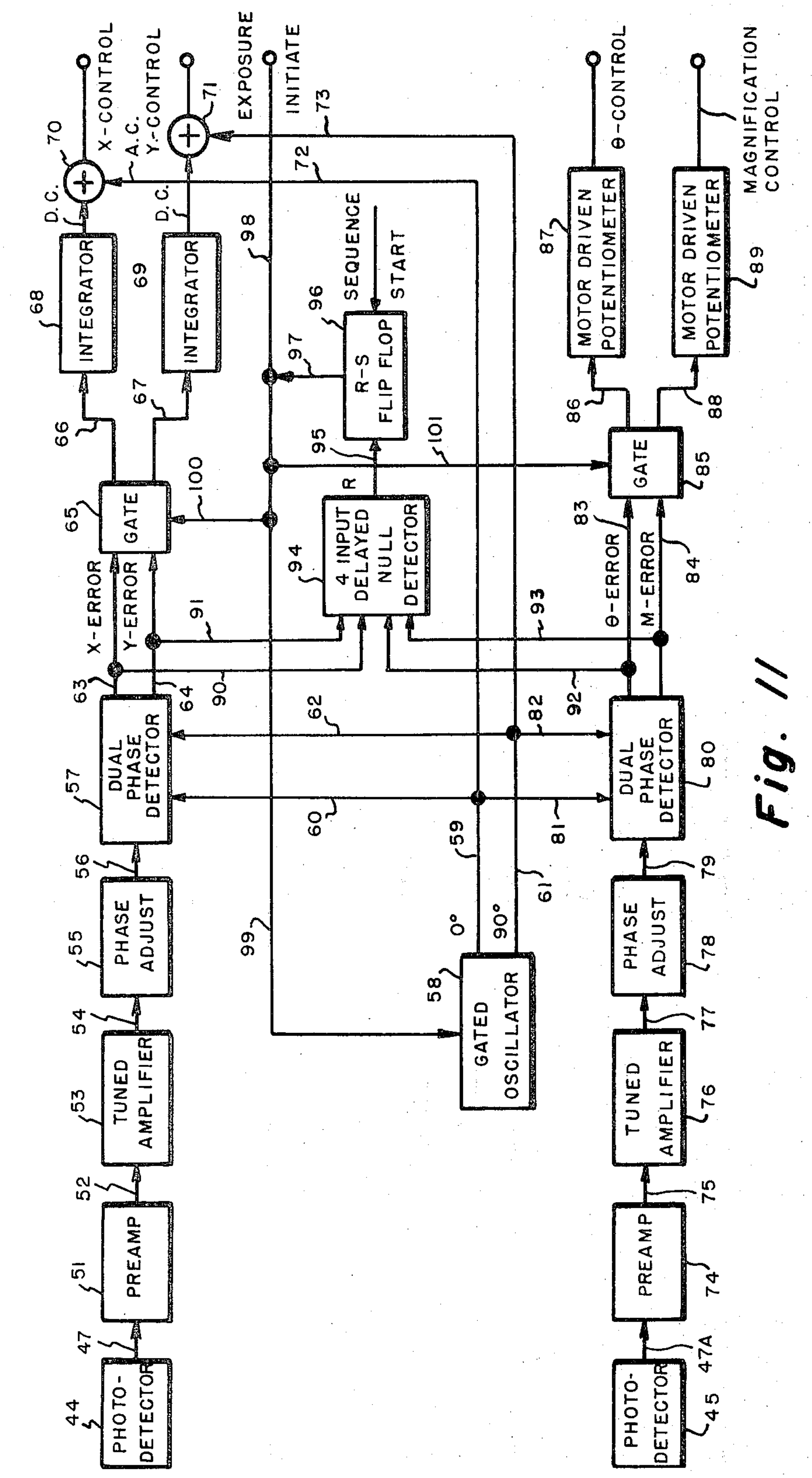
FIG. 11 is a block diagram of an electrical circuit for the electron image projection device shown in FIG. 1 to automatically align the electron beam pattern in accordance with the present invention.

Referring to FIG. 11, there is illustrated in a block diagram the electronics for adjusting the alignment beam portions 42 and 43 with respect to the detector marks 40 and 41 of the same corresponding predetermined shapes in oxide layer 16 and in turn precisely aligning member 15 with respect to the entire electron beam pattern from electromask 14. The modulated electrical signal from photodetector means 44 is conveyed via lead 47 to a preamplifier 51, which amplified signal is then conveyed via lead 52 to a tuned amplifier 53. The output of amplifier 53 passes through lead 54 to a phase adjustor 55 and then through lead 56 to a dual phase detector 57. A gated oscillator 58 impresses reference signals, which are 90° out-of-phase, through conductors 59 and 60 and conductors 61 and 62, respectively, on the dual phase detector 57. The outputs of phase detector 57 thus comprise X-error signals via lead 63 and Y-error signals via lead 64, which pass through gate 65 via leads 66 and 67 to integrators 68 and 69, respectively. The integrators 68 and 69 have direct-current outputs to adders 70 and 71, respectively, where the outputs are modulated with alternating current from the oscillator 58 via leads 72 and 73, respectively. The added modulated signals are then passed to and adjacent the controls in power units (not shown) of the type customarily used to power the electromagnetic coils, in this case the Helmholtz pair $26_1$ and $26_2$ and $27_1$ and $27_2$.

Similarly, the modulated signal from the photodetector means 45 is conducted via lead 47A to preamplifier 74, and passed thereafter via lead 75 to the tuned amplifier 76 and then via lead 77 through phase adjustor 78 and lead 79 to dual phase detector 80. Oscillator 58 also impresses the two 90° out-of-phase reference signals, above referred to, through leads 81 and 82 on dual phase detector 80. Two outputs from dual phase detector 80 are thus produced. The one output signal via conductor 83, which corresponds to a $\theta$ error signal, passes through gate 85 and lead 86 to control a motor-driven precision potentiometer 87 to effect the rotational control of the electron beam pattern by increasing or decreasing the current to the electromagnetic coils 25. The other output signal through lead 84, gate 85 and lead 88 to control the size of the patterned electron beam through a motor driven gang potentiometer 89 which adjusts the main focus field.

The error signals in conductors 63, 64, 83 and 84 are cross-fed electronically via leads 90, 91, 92 and 93, respectively, into a four input delayed null detector 94 whose output is conveyed by lead 95 to a set-reset flip-flop 96. The operation of the flip-flop is initiated by actuation of a start sequence switch, whereupon current begins to flow via leads 97 and 98 to energize the ultraviolet source 28 to cause electron beams to be emitted from photocathode source 14, including the two alignment beam portions 42 and 43. Likewise, current from 97 passes through leads 99 to the gates oscillator 58, which in turn feeds sinusoidal signals in quadrature through lines 59–72 and 61–73 to the X and Y controls 70 and 71, respectively. The entire electron beam pattern, including the alignment beam portions 42 and 43, are thus caused to oscillate typically in a circle of, for example, 6 microns diameter at a frequency of 45 Hertz.

Once the aligning electron beams 42 and 43 are centered in detector marks 40 and 41, respectively, by operation of integrators 68 and 69, and potentiometers 87 and 89, the error signals passing through leads 90, 91, 92 and 93 reach a zero value which is detected by the null detector 94. The null detector thereupon produces an electrical signal which passes through lead 95 to the flip-flop 96, which terminates the operation of the gated oscillator 58 and closed gates 65 and 85 by signals through leads 100 and 101, respectively. The time sequence of the selective electron beam exposure of an electroresist layer on the full area of oxide layer 16 and member 15 is then begun and continued until the resist is fully exposed. A period of from 3 to 10 seconds is usually adequate to produce a sufficient electron beam treatment of the electron resist to cause it to be properly differentially soluble in selected solvents. The photocathode source 14 has been generating a patterned electron beam from all the emissive areas during the alignment period; however, the alignment period is so brief that the electroresist on all the areas of the member 15 has not been significantly exposed.

Figure 12:
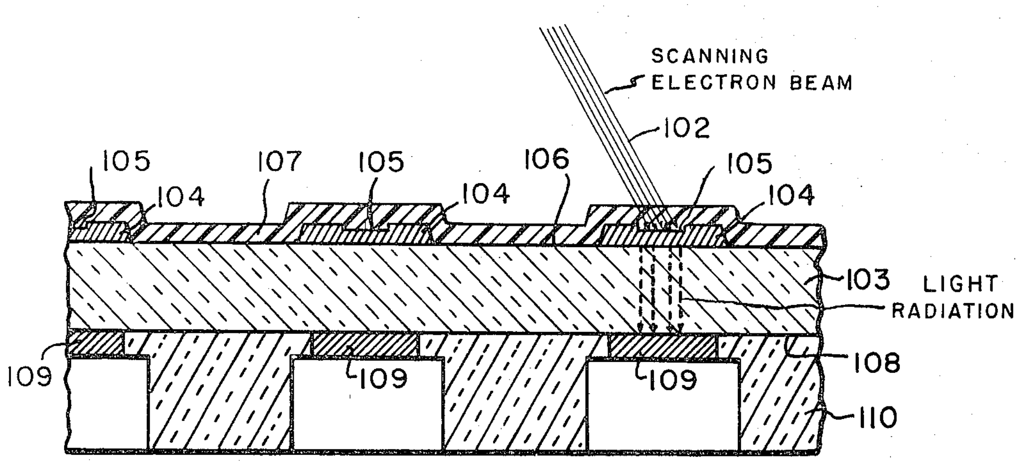
FIG. 12 is a schematic illustration of production of a highly accurate component pattern in an electroresist layer on a member utilizing a scanning electron beam in accordance with the present invention.
Figure 13:
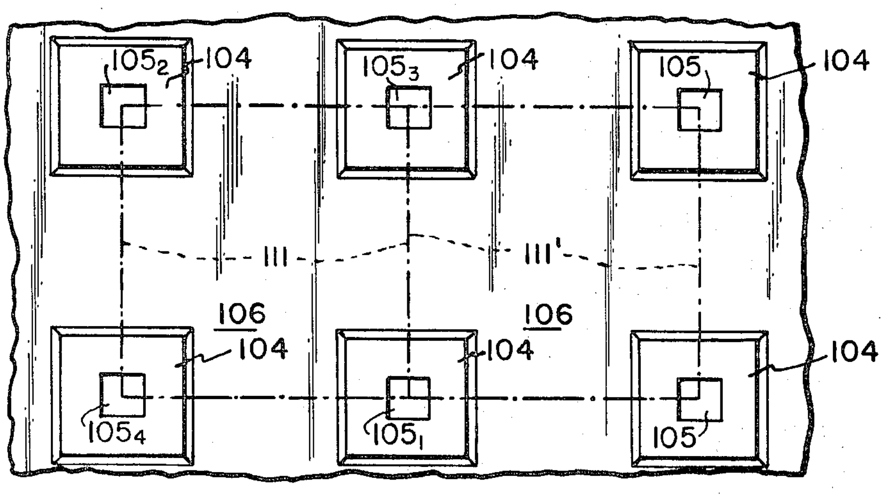
FIG. 13 is a partial top view of the member of FIG. 12 without the electroresist layer applied.
Figure 14:
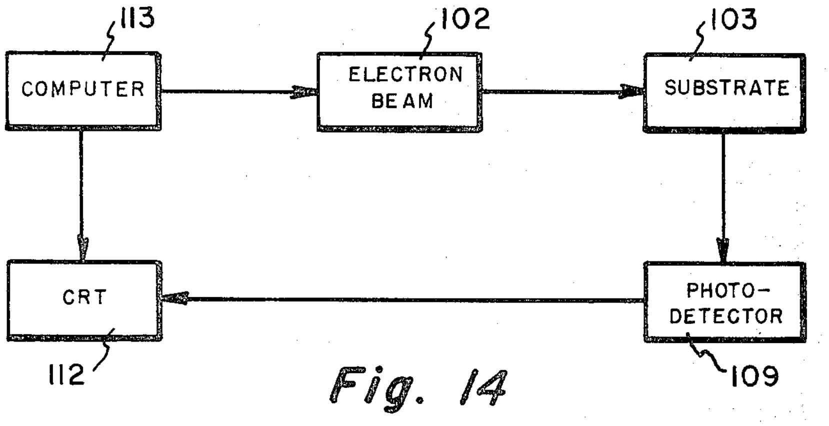
FIG. 14 is a flow diagram showing the interrelationship of functional component in utilizing the present invention to manually align the scanning electron beam as shown in FIG. 12.

Referring to FIGS. 12, 13 and 14, the invention can be similarly used to align a scanning electron beam 102 with a member 103. A scanning electron microscope for adoption to the present invention is shown in U.S. Pat. No. 3,679,497, assigned to the same assignee as the present apparatus. Preferably, the detector marks 105 each have the same predetermined shape and are spaced apart in oxide layers 104 in a uniformly spaced pattern as shown in FIG. 12, preferably dividing major surfaces 106 and the member 103 into contiguous symmetric fields suitable for selectively irradiating an electroresist layer over the member 103 with minimal distortion. Each detector mark 105 is preferably of the same or larger predetermined shape than the scanning electron beam, which operates in toto as the alignment beam portion in the alignment system. An electroresist layer in which the precision component pattern is to be formed is then overlaid on the major surface of member 103. A series of detector means 109 are positioned in holder 110 preferably adjacent the opposite surface 108 of the member 103. Each detector means 109 is positioned adjacent a detector mark 105 to detect cathodoluminescence generated by irradiation of the oxide layers 104 at and adjacent the detector marks 105.

Referring to FIGS. 13 and 14, this arrangement can be used to align the scanning electron beam with the major surface 106 of the member 103 field by field for selective irradiation of precisely selected areas of the major surface of the member. The member 103 is divided into contiguous fields 111 preferably bounded in quadrature by the detector marks 105, e.g., one at the intersection of each field, or one at the center along each side of each field with a detector means 109 positioned adjacent each detector mark 105. To align the beam 102 with, for example, field 111, the scanning electron beam 102 is modulated to overlap two opposite detector marks, for example, marks $105_1$ and $105_2$ sequentially. The output signals from the detector means are fed to a cathode-ray tube 112 which also has the intended locations of the detector marks for precise alignment inputted from the computer 113 controlling the scanning electron beam 102. The scanning beam 102 is thus moved relative to the member 103 until the signals from the two detector means 109, adjacent detector marks $\mathbf{105_1}$ and $\mathbf{105_2}$, respectively, are centered in the superimposed input of the intended locations of the detector marks $\mathbf{105_1}$ and $\mathbf{105_2}$ and thus alignment. The electron beam 102 is then modulated to overlap the other two opposite detector marks $\mathbf{105_3}$ and $\mathbf{105_4}$ sequentially until the outputs therefrom coincide on the CRT 112 within the superimposed intended input for detector marks $\mathbf{105_3}$ and $\mathbf{105_4}$ from the computer 113. The electron beam 102 is then aligned and ready to selectively irradiate the field on command from the computer 113. At the end of the irradiation of the field 111, the member 103 is physically moved so that the scan field of the electron beam is concurrent with the next field 111' on the member 103 to be selectively irradiated. The aligning sequence is then repeated as described above.

The alignment system shown in FIG. 14 is what one skilled in the art would connote a manual system because an operator makes the adjustments to align in accord with the read-out on the CRT. This is not a preferred system because of the relatively long length of time required to complete the alignment sequence. Thus, it is preferred that the detector marks be of the same predetermined shapes as the scanning electron beam and that an automatic system similar to that described in reference to FIG. 11 be used in place of the CRT (with manual adjustment) to automatically align the scanning electron beam sequentially with the fields 111.

While the presently preferred embodiments of the invention have been specifically described, it is distinctly understood that the invention may be otherwise variously embodied and used within the scope of the following claims.

What is claimed is:

1. A method of precision aligning an electron beam with selected areas of a major surface of a member comprising the steps of:

A. forming on a major surface of a member having thereon at least one oxide layer capable of generating cathodoluminescence at least one detector mark of predetermined shape, each said detector mark being capable of providing a differential in cathodoluminescence generated by the oxide layer corresponding to the area of the mark irradiated by an electron beam;

B. causing at least one electron beam to be aligned to be projected onto the major surface of the member, said electron beam having at least one alignment beam portion corresponding to at least one detector mark and having a predetermined cross-sectional shape;

C. detecting cathodoluminescence generated by the oxide layer at least at and adjacent where each said alignment beam portion overlaps and irradiates a corresponding detector mark;

D. moving the aligning electron beam relative to the member while continuing step C to detect irradiation of corresponding detector marks by the alignment beam portions; and E. positioning the electron beam relative to the member where the detected cathodoluminescence indicates optimum alignment of the alignment beam portions and corresponding detector marks.

2. A method of precision aligning an electron beam with selected areas of a major surface of a member as set forth in claim 1 wherein:

forming the detector mark includes providing a well in the oxide layer in the predetermined shape wherein the cathodoluminescence generated by the oxide layer corresponds in intensity to the thickness of the oxide layer, and the cathodoluminescence generated is detected through the member substantially transparent to the cathodoluminescence.

3. A method of precision aligning an electron beam with selected areas of a major surface of a member as set forth in claim 1 wherein:

forming the detector mark includes providing a mesa in the oxide layer in the predetermined shape wherein the cathodoluminescence generated by the oxide layer corresponds in intensity to the thickness of the oxide layer, and the cathodoluminescence generated is detected through the member substantially transparent to the cathodoluminescence.

4. A method of precision aligning an electron beam with selected areas of a major surface of a member as set forth in claim 1 wherein:

forming the detector mark includes positioning the oxide layer on the major surface of the member in the predetermined shape.

5. A method of precision aligning an electron beam with selected areas of a major surface of the member as set forth in claim 1 wherein:

forming the detector mark includes positioning the oxide layer on the major surface of the member to circumscribe an exposed portion of the major surface wherein the exposed portion is of the predetermined shape.

6. A method of precision aligning an electron beam with selected areas of a major surface of the member as set forth in claim 1 wherein:

forming the detector mark includes positioning an opaque layer adjacent the oxide layer in the predetermined shape.

7. A method of precision aligning an electron beam with selected areas of a major surface of the member as set forth in claim 1 wherein:

forming the detector mark includes positioning an opaque layer adjacent the oxide layer to circumscribe a portion of the oxide layer wherein said portion is of the predetermined shape.

8. A method of precision aligning an electron beam with selected areas of a major surface of the member as set forth in claim 1 wherein:

each detector mark is of substantially the same predetermined shape as the predetermined cross-sectional shape of the corresponding alignment beam portion.

9. A method of precision aligning an electron beam with selected areas of a major surface of the member as set forth in claim 1 wherein:

the electron beam to be aligned is a scanning electron beam for selectively irradiating an electroresist layer on the major surface of the member.

10. A method of precision aligning an electron beam with selected areas of a major surface of a member as set forth in claim 9 wherein:

the major surface of the member is divided into contiguous fields for selective irradiation, and the detector marks are positioned symmetrically along boundaries of said contiguous fields.

11. A method of precision aligning a patterned electron beam generated by a photocathode source with selected areas of a major surface of a member comprising the steps of:

A. forming on a major surface of a member having at least one oxide layer capable of generating cathodoluminescence two widely spaced apart detector marks of predetermined shape, each said detector mark being capable of providing a differential in cathodoluminescence generated by the oxide layer corresponding to the area of the mark irradiated by an electron beam;

B. causing a patterned electron beam with alignment beam portions corresponding to the detector marks to be projected by a cathode source onto the major surface of the member, each said electron beam portion corresponding to a detector mark and having at least one alignment beam portion of predetermined cross-sectional shape;

C. detecting the cathodoluminescence generated by the oxide layer at least at and adjacent where the alignment beam portion overlaps and irradiates the corresponding mark;

D. moving the patterned electron beam relative to the member while continuing step C to detect irradiation of the detector marks by the alignment beam portions; and E. positioning the alignment beam portions relative to the detector marks where the detected cathodoluminescence indicates optimum alignment of the corresponding alignment beam portions and the detector marks.

12. A method of precision alignment a patterned electron beam generated by a photocathode source with selected areas of a major surface of a member as set forth in claim 11 wherein:

forming each detector mark includes providing a well in the oxide layer in the predetermined shape wherein the cathodoluminescence generated by the oxide layer corresponds in intensity to the thickness of the oxide layer, and the cathodoluminescence generated is detected through the member being substantially transparent to the cathodoluminescence.

13. A method of precision aligning a patterned electron beam generated by a photocathode source with selected areas of a major surface of a member as set forth in claim 11 wherein:

forming each detector mark includes providing a mesa in the oxide layer in the predetermined shape wherein the cathodoluminescence generated by the oxide layer corresponds in intensity to the thickness of the oxide layer, and the cathodoluminescence generated is detected through the member being substantially transparent to the cathodoluminescence.

14. A method of precision aligning a patterned electron beam generated by a photocathode source with selected areas of a major surface of a member as set forth in claim 11 wherein:

forming each detector mark includes positioning the oxide layer on the major surface of the member in the predetermined shape.

15. A method of precision aligning a patterned electron beam generated by a photocathode source with selected areas of a major surface of a member as set forth in claim 11 wherein:

forming each detector mark includes positioning the oxide layer on the major surface of the member to circumscribe an exposed portion of the major surface wherein the exposed portion is of the predetermined shape.

16. A method of precision aligning a patterned electron beam generated by a photocathode source with selected areas of a major surface of a member as set forth in claim 11 wherein:

forming each detector mark includes providing an opaque layer adjacent the oxide layer in the predetermined shape.

17. A method of precision aligning a patterned electron beam generated by a photocathode source with selected areas of a major surface of a member as set forth in claim 11 wherein:

forming each detector mark includes providing an opaque layer adjacent the oxide layer to circumscribe a portion of the oxide layer wherein said portion is of the predetermined shape.

18. A method of precision aligning a patterned electron beam generated by a photocathode source with selected areas of a major surface of a member as set forth in claim 11 wherein:

each detector mark is of substantially the same predetermined shape as the predetermined cross-sectional shape of a corresponding alignment beam portion.

19. A method of precision aligning a patterned electron beam generated by a photocathode source with selected areas of a major surface of a member as set forth in claim 11 wherein:

steps D and E are automatically performed by electrically processing the electrical signal output corresponding to the detected cathodoluminescence on modulation of the movement of the alignment beam portions over the corresponding detector marks, the steps D and E automatically are terminated at optimum alignment of the corresponding alignment beam portions and detector marks.

20. Apparatus for selectively irradiating precisely located areas of a major surface of a member comprising:

A. a photocathode source for generating a patterned beam of electrons including at least one alignment beam portion of predetermined cross-sectional shape;

B. a member having thereon at least one oxide layer capable of generating cathodoluminescence and having at least one detector mark corresponding to each said alignment beam portion, each said detector mark having a predetermined shape and being capable of providing a differential in cathodoluminescence generated by the oxide layer corresponding to the area of the mark irradiated by an electron beam;

C. means for positioning the member in a spaced relation to the photocathode source of the patterned beam;

D. means for applying a potential between the member and the photocathode source whereby electrons from the photocathode source are directed to and selectively irradiate portions of the major source of the member;

E. electromagnetic means for directing the patterned beam of electrons from the photocathode source to irradiate selected portions of the major surface of the member close to the precisely located areas, and each alignment beam portion to irradiate selected portions of the surface portions of the major surface of the member close to a detector mark;

F. detector means for detecting the cathodoluminescence generated by the oxide layer at least at and adjacent the detector marks and producing an electrical signal corresponding to the area of the detector mark irradiated by the alignment beam portions; and G. electrical means for moving the patterned beam of electrons relative to the member responsive to said electrical signal from the detector means to cause the alignment beam portions to substantially align with the respective detector marks, whereby the patterned beam of electrons from the photocathode is located and oriented relative to the member so that precisely located areas of the major surface of the member can be selectively irradiated with the patterned electron beam.

21. Apparatus for selectively irradiating precisely located areas of a major surface of a member as set forth in claim 20 wherein:

the patterned beam of electrons generated by the photocathode source includes at least two spaced apart alignment beam portions having predetermined cross-sectional shapes substantially the same as the predetermined shapes of the corresponding detector marks.

22. Apparatus for selectively irradiating precisely located areas of a major surface of a member as set forth in claim 21 wherein:

the electrical means includes modulation means for oscillating the movement of each alignment beam portion on a corresponding detector mark, phase detection means for detecting along orthogonal axes the error from alignment of the corresponding alignment beam portions and detector marks and outputting an electrical signal corresponding thereto, and actuating means for changing the electrical input to the electromagnetic means responsive to the electrical signal from the phase detector means to bring the alignment beam portions and the detector marks into alignment.

* * * * *